US009569489B2

(12) United States Patent
Dai et al.

(10) Patent No.: US 9,569,489 B2
(45) Date of Patent: Feb. 14, 2017

(54) METHOD AND APPARATUS FOR DATA PREHEATING

(71) Applicant: Huawei Technologies Co., Ltd., Shenzhen, Guangdong (CN)

(72) Inventors: Kun Dai, Shenzhen (CN); Huaizhou Li, Hangzhou (CN); Jiao Song, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 380 days.

(21) Appl. No.: 14/278,707

(22) Filed: May 15, 2014

(65) Prior Publication Data

US 2014/0250102 A1 Sep. 4, 2014

Related U.S. Application Data

(63) Continuation of application No. PCT/CN2012/072863, filed on Mar. 23, 2012.

(30) Foreign Application Priority Data

Nov. 18, 2011 (CN) .......................... 2011 1 0369378

(51) Int. Cl.
  *G06F 17/30* (2006.01)
  *G06F 12/02* (2006.01)
  *G06F 12/08* (2016.01)
(52) U.S. Cl.
  CPC ... *G06F 17/30442* (2013.01); *G06F 17/30289* (2013.01); *G06F 12/0246* (2013.01); *G06F 12/0862* (2013.01)

(58) Field of Classification Search
  CPC ................. G06F 17/30442; G06F 17/30289; G06F 12/0862; G06F 12/0246
  See application file for complete search history.

(56) References Cited

U.S. PATENT DOCUMENTS 5,239,644 A 8/1993 Seki et al.
6,463,509 B1 10/2002 Teoman et al.
(Continued)

FOREIGN PATENT DOCUMENTS

CN 1945552 A 4/2007
CN 101067820 A 11/2007
(Continued)

*Primary Examiner* — Albert Phillips, III

(57) ABSTRACT

Embodiments of the present invention disclose a method and an apparatus for data preheating, which relate to database technologies, so as to increase a responding speed of a database system, reduce frequent IO on a magnetic disk, and improve overall performance of the database system. The method includes: when a database is started, reading hit ratio information from a flash memory device and reading user configuration information from a hard disk; obtaining a union set of a preset hot data table in the user configuration information and a hot data table in the hit ratio information; determining the total number of to-be-loaded hot data blocks from the union set; according to the storage proportions, determining the to-be-loaded hot data block to be stored into a shared buffer and the flash memory device; and separately storing the to-be-loaded hot data block into the shared buffer and the flash memory device.

16 Claims, 7 Drawing Sheets

(56) References Cited

U.S. PATENT DOCUMENTS

| | | | | |
|---|---|---|---|---|
| 8,429,346 B1* | 4/2013 | Chen | ............... | G06F 3/0689 |
| | | | | 709/213 |
| 8,478,731 B1* | 7/2013 | Throop | ............ | G06F 17/30153 |
| | | | | 707/693 |
| 8,566,483 B1* | 10/2013 | Chen | ............... | G06F 3/0605 |
| | | | | 710/18 |
| 9,256,381 B1* | 2/2016 | Fultz | ............... | G06F 3/0611 |
| 2003/0037049 A1 | 2/2003 | Weigelt | | |
| 2003/0221069 A1* | 11/2003 | Azevedo | ............ | G06F 12/0862 |
| | | | | 711/136 |
| 2007/0061446 A1* | 3/2007 | Matsuo | ............... | G06F 3/061 |
| | | | | 709/224 |
| 2007/0255844 A1 | 11/2007 | Shen et al. | | |
| 2008/0301151 A1 | 12/2008 | Idei et al. | | |
| 2010/0095073 A1* | 4/2010 | Caulkins | ............ | G06F 12/0866 |
| | | | | 711/154 |
| 2010/0100699 A1* | 4/2010 | Caulkins | ............... | G06F 3/061 |
| | | | | 711/171 |
| 2010/0161780 A1* | 6/2010 | Lee | ............... | H04L 67/1095 |
| | | | | 709/223 |
| 2010/0199036 A1* | 8/2010 | Siewert | ............... | G06F 3/0613 |
| | | | | 711/112 |
| 2011/0066791 A1 | 3/2011 | Goyal et al. | | |
| 2011/0246721 A1* | 10/2011 | Crisan | ............... | G06F 11/1464 |
| | | | | 711/130 |
| 2012/0203910 A1 | 8/2012 | Lan et al. | | |

FOREIGN PATENT DOCUMENTS

| | | |
|---|---|---|
| CN | 101668046 A | 3/2010 |
| CN | 102141963 A | 8/2011 |
| CN | 102222107 A | 10/2011 |
| JP | 2004118305 A | 4/2004 |
| WO | WO 2011/059979 A1 | 5/2011 |

* cited by examiner

METHOD AND APPARATUS FOR DATA PREHEATING

CROSS-REFERENCE TO RELATED APPLICATIONS

This application is a continuation of International Application No. PCT/CN2012/072863, filed on Mar. 23, 2012, which claims priority to Chinese Patent Application No. 201110369378.5, filed on Nov. 18, 2011, both of which are hereby incorporated by reference in their entireties.

TECHNICAL FIELD

The present invention relates to the field of database technologies, and in particular, to a method and an apparatus for data preheating.

BACKGROUND

With rapid development of database technologies, a database storage system presents the following characteristics:

A novel storage device, such as a solid-state drive (Solid-State Drive, SSD) and a phase change memory, and a conventional magnetic disk device constitute a hybrid storage environment. Compared with a conventional magnetic disk, the SSD based on a flash memory has advantages of high performance and low energy consumption, and its price and capacity are between those of a memory and those of the conventional magnetic disk. It is predicted that, in a long time from now, various types of hard disk devices will coexist, and hybrid storage will become a mainstream storage configuration. As there are more and more applications, the data amount of a user grows larger and larger, and an input/output (Input/Output, IO) bottleneck problem caused by conventional data storage is prominent; some important application requirements require a database system to respond quickly, in time, and correctly.

In the prior art, a controller device with a cache is provided between a main memory and an external memory to implement preloading of data of a next request, and transfer the data to the main memory when the request arrives. Alternatively, a flash memory device is used as a level 2 cache; when a buffer of the main memory is full, some data blocks that need to be replaced are written into the flash memory device; and in a startup phase of a database, some hot data is not preloaded according to actual usage of a user.

In the prior art, in an early phase after the database is started, when the amount of data requested by a client is large and a service is very busy, responding efficiency of the database system will be lowered, and IO will be very busy, affecting overall performance of the database system.

SUMMARY

Embodiments of the present invention provide a method and an apparatus for data preheating, so as to increase a responding speed of a database system, reduce frequent IO on a magnetic disk, and improve overall performance of the database system.

Embodiments of the present invention adopt the following technical solutions:

A method for data preheating includes:

when a database is started, separately reading hit ratio information and reading user configuration information, where the hit ratio information includes a hot data table, and the user configuration information includes a preset hot data table, storage proportions of a to-be-loaded hot data block stored into a shared buffer and a flash memory device, a capacity of the shared buffer, a storage capability of the flash memory device, and a deviation value of the total number of the to-be-loaded hot data blocks;

obtaining a union set of the preset hot data table in the user configuration information and the hot data table in the hit ratio information;

determining the total number of the to-be-loaded hot data blocks from the union set according to the storage proportions, the capacity of the shared buffer, a capacity of the flash memory device, a size of the hot data block, and the deviation value;

according to the storage proportions, determining the to-be-loaded hot data block to be stored into the shared buffer and the flash memory device; and separately storing the to-be-loaded hot data block into the shared buffer and the flash memory device.

An apparatus for data preheating includes:

a reading unit, configured to: when a database is started, separately read hit ratio information and read user configuration information, where the hit ratio information includes a hot data table, and the user configuration information includes a preset hot data table, storage proportions of a to-be-loaded hot data block stored into a shared buffer and a flash memory device, a capacity of the shared buffer, a storage capability of the flash memory device, and a deviation value of the total number of the to-be-loaded hot data blocks;

an obtaining unit, configured to obtain a union set of the preset hot data table in the user configuration information and the hot data table in the hit ratio information;

a first processing unit, configured to determine the total number of the to-be-loaded hot data blocks from the union set according to the storage proportions, the capacity of the shared buffer, a capacity of the flash memory device, a size of the hot data block, and the deviation value;

a second processing unit, configured to: according to the storage proportions, determine the to-be-loaded hot data block to be stored into the shared buffer and the flash memory device; and a storing unit, configured to separately store the to-be-loaded hot data block into the shared buffer and the flash memory device.

In a method and an apparatus for data preheating provided in embodiments of the present invention, some hot data blocks are prestored into a shared buffer and a flash memory device according to actual usage of a user when a database is started. The embodiments of the present invention solve a problem in the prior art that, when the database is started, the amount of data requested by a client is large, and a service is very busy, responding efficiency of the database system will be lowered, and IO will be very busy, affecting overall performance of the database system, so as to increase a responding speed of the database system, reduce frequent IO on a magnetic disk, and improve overall performance of the database system.

DETAILED DESCRIPTION

The following describes a method and an apparatus for data preheating according to embodiments of the present invention in detail with reference to accompanying drawings.

Embodiment 1

Figure 1:
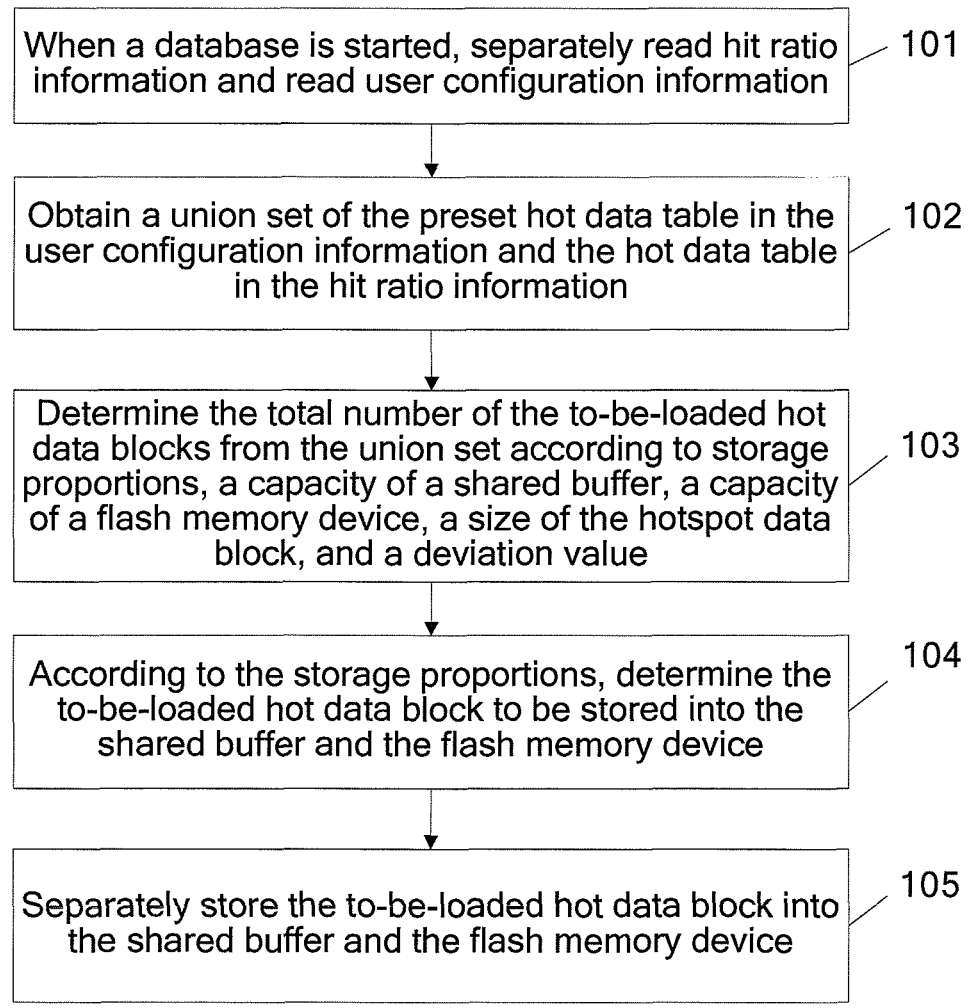
FIG. 1 is a flowchart of main operation steps for a method for data preheating according to Embodiment 1 of the present invention.

A method for data preheating provided in an embodiment of the present invention, as shown in FIG. 1, includes:

101: When a database is started, separately read hit ratio information and read user configuration information, where the hit ratio information includes a hot data table, and the user configuration information includes a preset hot data table, storage proportions of a to-be-loaded hot data block stored into a shared buffer and a flash memory device, a capacity of the shared buffer, a storage capability of the flash memory device, and a deviation value of the total number of the to-be-loaded hot data blocks.

102: Obtain a union set of the preset hot data table in the user configuration information and the hot data table in the hit ratio information.

103: Determine the total number of the to-be-loaded hot data blocks from the union set according to the storage proportions, the capacity of the shared buffer, a capacity of the flash memory device, a size of the hot data block, and the deviation value.

104: According to the storage proportions, determine the to-be-loaded hot data block to be stored into the shared buffer and the flash memory device.

105: Separately store the to-be-loaded hot data block into the shared buffer and the flash memory device.

In the method for data preheating provided in the embodiment of the present invention, some hot data is preheated according to actual usage of a user when the database is started. The embodiment of the present invention solves a problem in the prior art that, when the amount of data requested by a client is large, and a service is very busy in an early phase after the database is started, responding efficiency of the database system will be lowered, and IO will be very busy, affecting overall performance of the database system, so as to increase a responding speed of the database system, reduce frequent IO on a magnetic disk, and improve overall performance of the database system.

Figure 2:
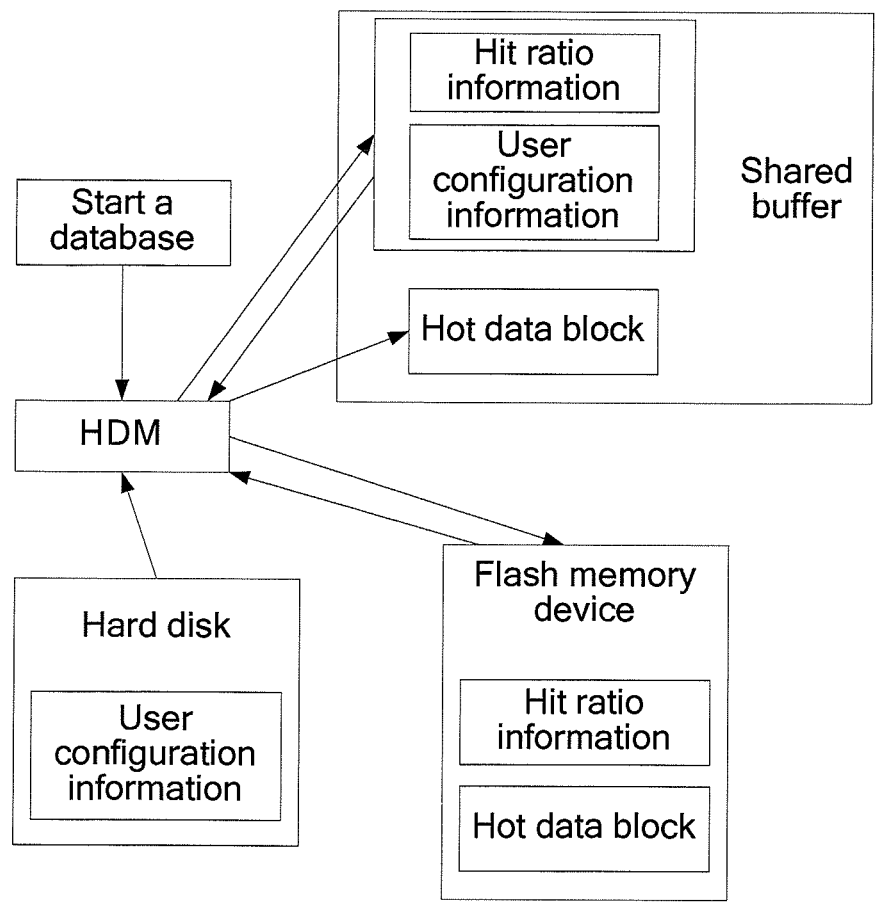
FIG. 2 is a schematic diagram of an HDM managing hot data in a database system for a method for data preheating according to Embodiment 1 of the present invention.

The present invention mainly adds a hot data management (HDM) module to a database system to perform processing of data preheating. FIG. 2 is a schematic diagram of an HDM managing hot data in a database system.

Figure 3A:
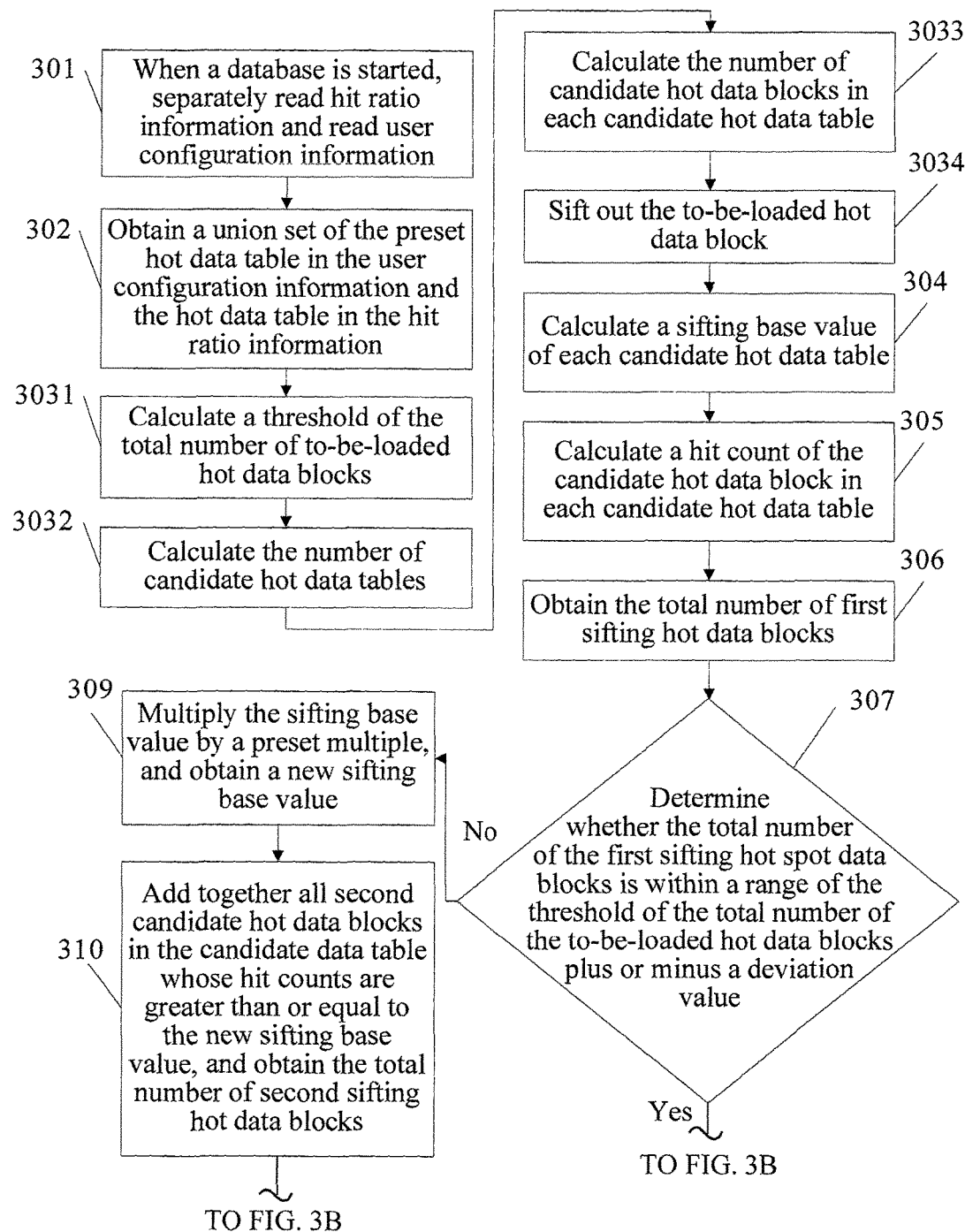
FIG. 3A and FIG. 3B illustrate a flowchart of overall operation steps for a method for data preheating according to Embodiment 1 of the present invention.
Figure 3B:
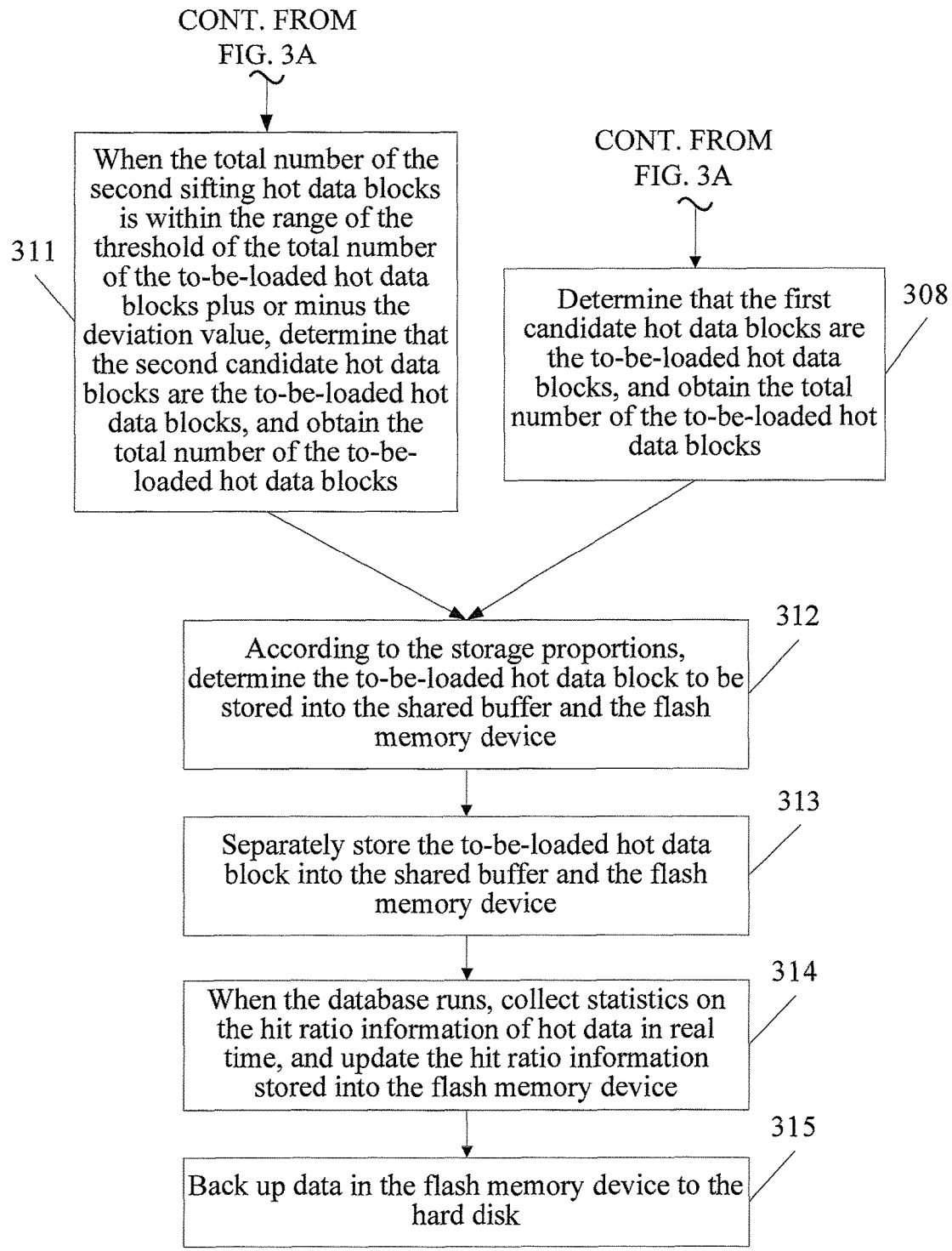

In a specific application, as shown in FIG. 3A and FIG. 3B, an operation process is as follows:

301: When a database is started, separately read hit ratio information and read user configuration information, where the hit ratio information includes a hot data table, and the user configuration information includes a preset hot data table, storage proportions of a to-be-loaded hot data block stored into a shared buffer and a flash memory device, a capacity of the shared buffer, a storage capability of the flash memory device, and a deviation value of the total number of the to-be-loaded hot data blocks.

The hit ratio information is read from the flash memory device, the user configuration information is read from a hard disk, and the hit ratio information and the user configuration information are stored into a shared buffer of a main memory.

The hit ratio information includes the hot data table, and a hit count and a ranking of the hot data table, and a hit ratio and a ranking of the hot data block.

When the database is started and the hit ratio information fails to be read from the flash memory device, the hit ratio information is read from the hard disk.

302: Obtain a union set of the preset hot data table in the user configuration information and the hot data table in the hit ratio information.

The total number of the to-be-loaded hot data blocks is determined from the union set according to the storage proportions, the capacity of the shared buffer, a capacity of the flash memory device, a size of the hot data block, and the deviation value. The following substeps 3031 to 3034 are specifically included:

3031: Calculate a threshold of the total number of the to-be-loaded hot data blocks according to the storage proportions, the capacity of the shared buffer, the capacity of the flash memory device, and the size of the hot data block.

Specifically, the threshold of the total number of the to-be-loaded hot data blocks is calculated according to $$TDB = \frac{(a_1 \times BufCapacity + a_2 \times Capacity)}{BlockSize},$$

where TDB is the threshold of the total number of the to-be-loaded hot data blocks, $a_1$ is the storage proportion of the to-be-loaded hot data block stored into the shared buffer, $a_2$ is the storage proportion of the to-be-loaded hot data block stored into the flash memory device, $0 \leq a_1 \leq 1$, $0 \leq a_2 \leq 1$, BufCapacity is the capacity of the shared buffer, Capacity is the capacity of the flash memory device, and BlockSize is the size of the hot data block.

3032: Calculate the number of candidate hot data tables TCT according to the threshold of the total number of the to-be-loaded hot data blocks, the total number of hot data tables in the union set, and the total number of hot data blocks in the union set, where the candidate hot data table is first TCT hot data table whose hit count is the highest in the union set.

Specifically, the number of candidate hot data tables TCT is calculated according to $$TCT = \left\lceil TT \times \left(\frac{TDB}{TB} \times 100\%\right) \right\rceil,$$

where TCT is the number of candidate hot data tables, TT is the total number of hot data tables in the union set, TDB is the threshold of the total number of the to-be-loaded hot data blocks, and TB is the total number of hot data blocks in the union set.

3033: Calculate the number of candidate hot data blocks in each candidate hot data table according to the threshold of the total number of the to-be-loaded hot data blocks, the total number of hot data blocks in the candidate hot data table, and the total number of hot data blocks in the union set.

Specifically, the number of candidate hot data blocks in each candidate hot data table is calculated according to $$BN = \left\lceil TBN \times \left(\frac{TDB}{TB} \times 100\%\right)\right\rceil,$$

where BN is the number of candidate hot data blocks in each candidate hot data table, TBN is the total number of hot data blocks in each candidate hot data table, TDB is the threshold of the total number of the to-be-loaded hot data blocks, and TB is the total number of hot data blocks in the union set.

3034: Sift out the to-be-loaded hot data block from the candidate hot data block in the candidate hot data table, and obtain the total number of the to-be-loaded hot data blocks. Steps 304 to 311 are specifically included:

304: Calculate a sifting base value of each candidate hot data table according to $FB=THN_{TCT/2} \times BR_{BN}$, where FB is the sifting base value of each candidate hot data table, $THN_{TCT/2}$ is a hit count of a $\lceil TCT/2 \rceil^{th}$ candidate hot data table, and $BR_{BN}$ is a hit ratio of a $BN^{th}$ hot data block of hot data blocks whose hit ratios are the highest in each candidate hot data table.

305: Calculate the hit count of the candidate hot data block in each candidate hot data table according to $PB=PT \times QB$, where PB is the hit count of the candidate hot data block in each candidate hot data table, PT is the hit count of each candidate hot data table, and QB is the hit ratio of the candidate hot data block in each candidate hot data table.

306: Add together all first candidate hot data blocks in the candidate data table whose hit counts are greater than or equal to the sifting base value of the candidate hot data table, and obtain the total number of first sifting hot data blocks.

307: Determine whether the total number of the first sifting hot data blocks is within a range of the threshold of the total number of the to-be-loaded hot data blocks plus or minus the deviation value.

308: When the total number of the first sifting hot data blocks is within the range of the threshold of the total number of the to-be-loaded hot data blocks plus or minus the deviation value, determine that the first candidate hot data blocks are the to-be-loaded hot data blocks, and obtain the total number of the to-be-loaded hot data blocks.

The sifting base value of each candidate hot data table is recorded.

309: When the total number of the first sifting hot data blocks is not within the range of the threshold of the total number of the to-be-loaded hot data blocks plus or minus the deviation value, multiply the sifting base value by a preset multiple, and obtain a new sifting base value.

Two situations exist herein:

When the total number of the first sifting hot data blocks is greater than the sum of the threshold of the total number of the to-be-loaded hot data blocks and the deviation value, the sifting base value is doubled.

When the total number of the first sifting hot data blocks is less than the difference between the threshold of the total number of the to-be-loaded hot data blocks and the deviation value, the sifting base value is halved.

For example, the deviation value may be set to 1 or 2.

310: Add together all second candidate hot data blocks in the candidate data table whose hit counts are greater than or equal to the new sifting base value, and obtain the total number of second sifting hot data blocks.

311: When the total number of the second sifting hot data blocks is within the range of the threshold of the total number of the to-be-loaded hot data blocks plus or minus the deviation value, determine that the second candidate hot data blocks are the to-be-loaded hot data blocks, and obtain the total number of the to-be-loaded hot data blocks.

The new sifting base value of each hot data table is recorded.

The sifting base value that is finally obtained is used as a preliminary sifting base value when the database is restarted next time.

312: According to the storage proportions, determine the to-be-loaded hot data block to be stored into the shared buffer and the flash memory device.

313: Separately store the to-be-loaded hot data block into the shared buffer and the flash memory device.

A hash (HASH) index is established in the shared buffer for the hot data block stored into the flash memory device, so as to read the hot data block in the flash memory device.

314: When the database runs, collect statistics on the hit ratio information of hot data in real time, and update the hit ratio information stored into the flash memory device.

The hit ratio information stored into the flash memory device is updated, so as to be easily read and used when the database is restarted next time.

315: Back up data in the flash memory device to the hard disk, where the backup data includes the updated hit ratio information.

The hit ratio information recently updated is backed up to the hard disk, so as to prevent the flash memory device from failing to read the hit ratio information when a special situation happens to the flash memory device, such as damage, dropping, or replacement.

The present invention is not limited to a storage system in an SSD+HDD (hard disk drive, hard disk drive) manner, and may be further applied to various hybrid storage systems.

Hot data preloading is not limited to loading of the hot data table, and is also applicable to hot statistics of an index data table.

Embodiment 2

Figure 4:
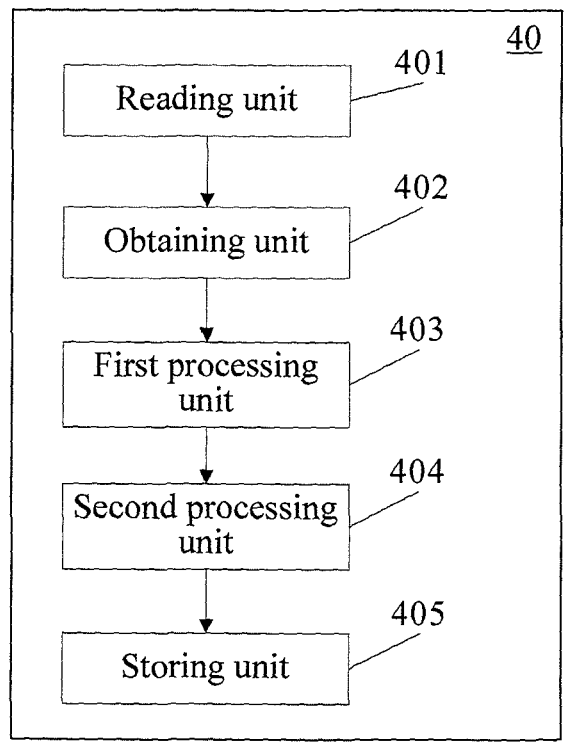
FIG. 4 is a main structural diagram of an apparatus for data preheating according to Embodiment 2 of the present invention.

An apparatus for data preheating 40 provided in an embodiment of the present invention, as shown in FIG. 4, includes a reading unit 401, an obtaining unit 402, a first processing unit 403, a second processing unit 404, and a storing unit 405.

The reading unit 401 is configured to: when a database is started, separately read hit ratio information and read user configuration information, where the hit ratio information includes a hot data table, and the user configuration information includes a preset hot data table, storage proportions of a to-be-loaded hot data block stored into a shared buffer and a flash memory device, a capacity of the shared buffer, a storage capability of the flash memory device, and a deviation value of the total number of the to-be-loaded hot data blocks.

The obtaining unit 402 is configured to obtain a union set of the preset hot data table in the user configuration information and the hot data table in the hit ratio information.

The first processing unit 403 is configured to determine the total number of the to-be-loaded hot data blocks from the union set according to the storage proportions, the capacity of the shared buffer, a capacity of the flash memory device, a size of the hot data block, and the deviation value.

The second processing unit 404 is configured to: according to the storage proportions, determine the to-be-loaded hot data block to be stored into the shared buffer and the flash memory device.

The storing unit 405 is configured to separately store the to-be-loaded hot data block into the shared buffer and the flash memory device.

In the apparatus for data preheating provided in the embodiment of the present invention, some hot data is preheated according to actual usage of a user when the database is started. The embodiment of the present invention solves a problem in the prior art that, when the amount of data requested by a client is large, and a service is very busy in an early phase after the database is started, responding efficiency of the database system will be lowered, and IO will be very busy, affecting overall performance of the database system, so as to increase a responding speed of the database system, reduce frequent IO on a magnetic disk, and improve overall performance of the database system.

The apparatus for data preheating provided in the embodiment of the present invention further includes:

When the database is started and the hit ratio information fails to be read from the flash memory device, the hit ratio information is read from the hard disk.

Figure 5:
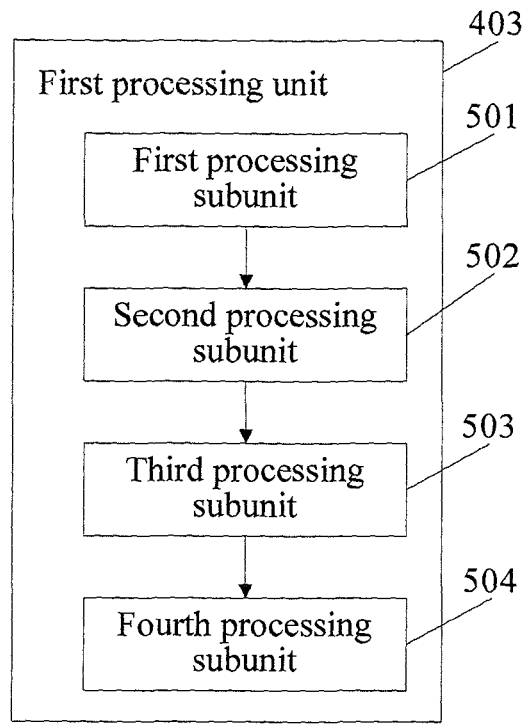
FIG. 5 is a structural diagram of a processing unit in an apparatus for data preheating according to Embodiment 2 of the present invention.

The apparatus for data preheating provided in the embodiment of the present invention is shown in FIG. 5, where the first processing unit 403 includes:

a first processing subunit 501, configured to calculate a threshold of the total number of the to-be-loaded hot data blocks according to the storage proportions, the capacity of the shared buffer, the capacity of the flash memory device, and the size of the hot data block, where specifically, the threshold of the total number of the to-be-loaded hot data blocks is calculated according to $$TDB = \frac{(a_1 \times BufCapacity + a_2 \times Capacity)}{BlockSize},$$

where TDB is the threshold of the total number of the to-be-loaded hot data blocks, $a_1$ is the storage proportion of the to-be-loaded hot data block stored into the shared buffer, $a_2$ is the storage proportion of the to-be-loaded hot data block stored into the flash memory device, $0 \le a_1 \le 1$, $0 \le a_2 \le 1$, BufCapacity is the capacity of the shared buffer, Capacity is the capacity of the flash memory device, and BlockSize is the size of the hot data block;

a second processing subunit 502, configured to calculate the number of candidate hot data tables TCT according to the threshold of the total number of the to-be-loaded hot data blocks, the total number of hot data tables in the union set, and the total number of hot data blocks in the union set, where the candidate hot data table is first TCT hot data table whose hit count is the highest in the union set, where specifically, the number of candidate hot data tables TCT is calculated according to $$TCT = \left\lceil TT \times \left(\frac{TDB}{TB} \times 100\%\right) \right\rceil,$$

where TCT is the number of candidate hot data tables, TT is the total number of hot data tables in the union set, TDB is the threshold of the total number of the to-be-loaded hot data blocks, and TB is the total number of hot data blocks in the union set;

a third processing subunit 503, configured to calculate the number of candidate hot data blocks in each candidate hot data table according to the threshold of the total number of the to-be-loaded hot data blocks, the total number of hot data blocks in the candidate hot data table, and the total number of hot data blocks in the union set, where specifically, the number of candidate hot data blocks in each candidate hot data table is calculated according to $$BN = \left\lceil TBN \times \left(\frac{TDB}{TB} \times 100\%\right) \right\rceil,$$

where BN is the number of candidate hot data blocks in each candidate hot data table, TBN is the total number of hot data blocks in each candidate hot data table, TDB is the threshold of the total number of the to-be-loaded hot data blocks, and TB is the total number of hot data blocks in the union set; and a fourth processing subunit 504, configured to sift out the to-be-loaded hot data block from the candidate hot data block in the candidate hot data table, and obtain the total number of the to-be-loaded hot data blocks.

Figure 6:
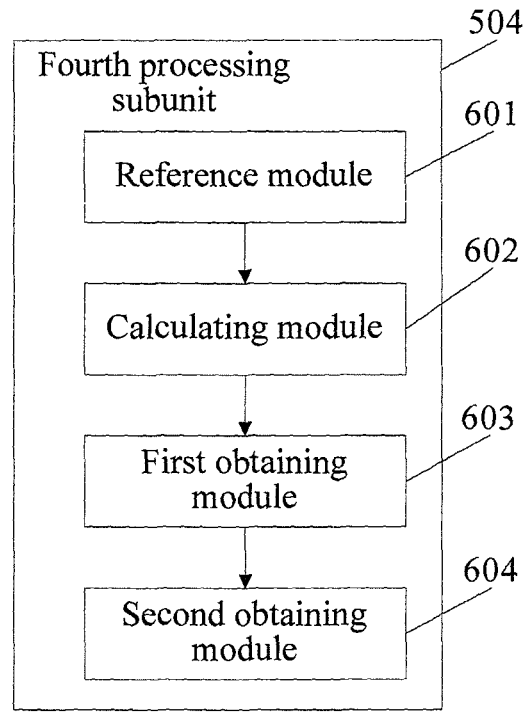
FIG. 6 is a main structural diagram of a fourth processing subunit in an apparatus for data preheating according to Embodiment 2 of the present invention.

The apparatus for data preheating provided in the embodiment of the present invention is shown in FIG. 6, where the fourth processing subunit 504 includes:

a reference module 601, configured to calculate a sifting base value of each candidate hot data table according to $FB = THN_{TCT/2} \times BR_{BN}$, where FB is the sifting base value of each candidate hot data table, $THN_{TCT/2}$ is a hit count of a $\lceil TCT/2 \rceil^{th}$ candidate hot data table, and $BR_{BN}$ is a hit ratio of a $BN^{th}$ hot data block of hot data blocks whose hit ratios are the highest in each candidate hot data table;

a calculating module 602, configured to calculate the hit count of the candidate hot data block in each candidate hot data table according to $PB = PT \times QB$, where PB is the hit count of the candidate hot data block in each candidate hot data table, PT is the hit count of each candidate hot data table, and QB is the hit ratio of the candidate hot data block in each candidate hot data table;

a first obtaining module 603, configured to add together all first candidate hot data blocks in the candidate data table whose hit counts are greater than or equal to the sifting base value of the candidate hot data table, and obtain the total number of first sifting hot data blocks; and a second obtaining module 604, configured to: when the total number of the first sifting hot data blocks is within a range of the threshold of the total number of the to-be-loaded hot data blocks plus or minus the deviation value, determine that the first candidate hot data blocks are the to-be-loaded hot data blocks, and obtain the total number of the to-be-loaded hot data blocks.

Figure 7:
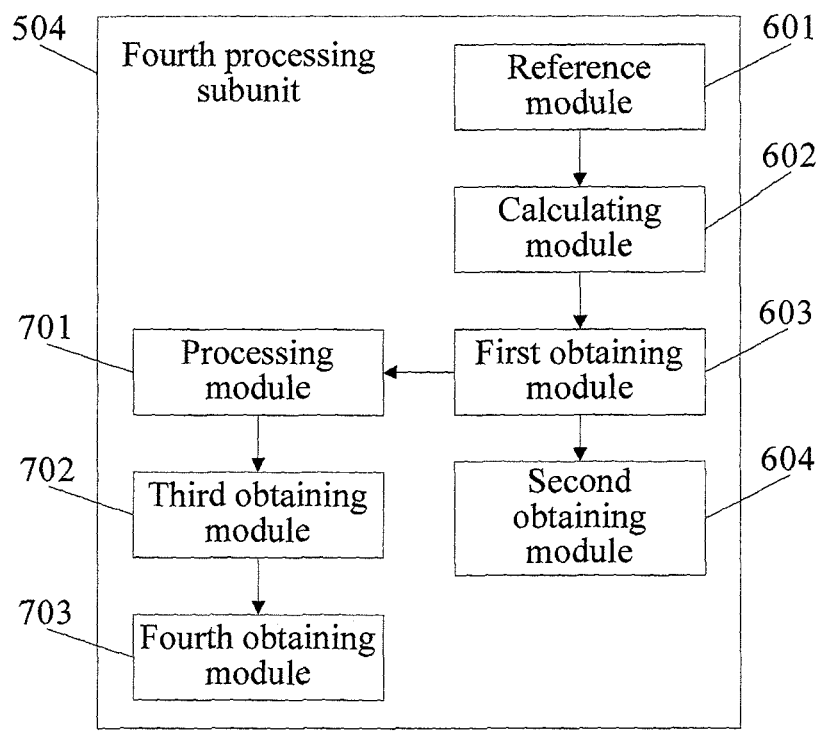
FIG. 7 is an overall structural diagram of a fourth processing subunit in an apparatus for data preheating according to Embodiment 2 of the present invention.

The apparatus for data preheating provided in the embodiment of the present invention is shown in FIG. 7, where the fourth processing subunit 504 further includes:

a processing module 701, configured to: when the total number of the first sifting hot data blocks is not within the range of the threshold of the total number of the to-be-loaded hot data blocks plus or minus the deviation value, multiply the sifting base value by a preset multiple, and obtain a new sifting base value;

a third obtaining module 702, configured to add together all second candidate hot data blocks in the candidate data table whose hit counts are greater than or equal to the new sifting base value, and obtain the total number of second sifting hot data blocks; and a fourth obtaining module 703, configured to: when the total number of the second sifting hot data blocks is within the range of the threshold of the total number of the to-be-loaded hot data blocks plus or minus the deviation value, determine that the second candidate hot data blocks are the to-be-loaded hot data blocks, and obtain the total number of the to-be-loaded hot data blocks.

Figure 8:
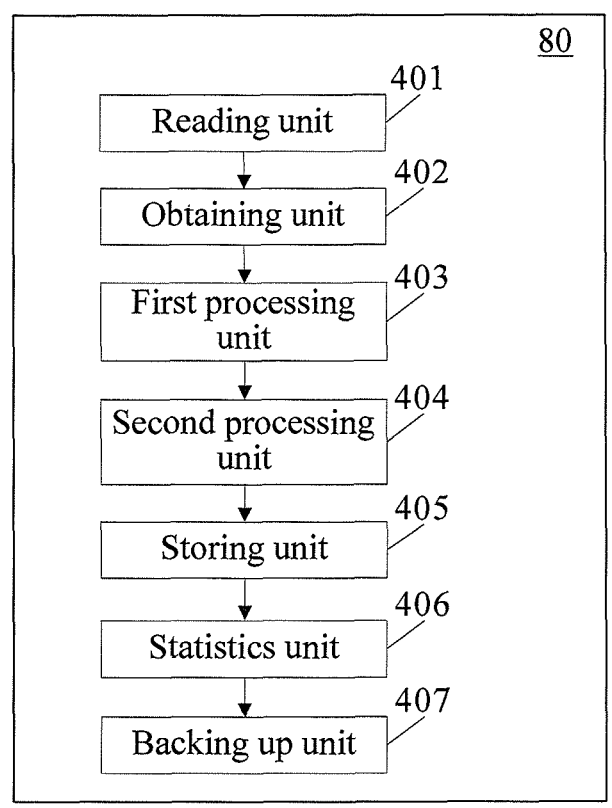
FIG. 8 is an overall structural diagram of an apparatus for data preheating according to Embodiment 2 of the present invention.

An apparatus for data preheating 80 provided in the embodiment of the present invention, as shown in FIG. 8, further includes a statistics unit 406 and a backing up unit 407.

The statistics unit 406 is configured to: when the database runs, collect statistics on the hit ratio information of hot data in real time, and update the hit ratio information stored into the flash memory device.

The backing up unit 407 is configured to back up data in the flash memory device to the hard disk, where the backup data includes the updated hit ratio information.

For an operation process of this apparatus, refer to an implementation process of the foregoing method for data preheating.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for data preheating, the method comprising:
    reading, separately, hit ratio information and user configuration information when a database is started, wherein the hit ratio information comprises a hot data table, and the user configuration information comprises a preset hot data table, storage proportions of a to-be-loaded hot data block stored into a shared buffer and a flash memory device, a capacity of the shared buffer, a storage capability of the flash memory device, and a deviation value of the total number of the to-be-loaded hot data blocks;
    obtaining a union set of the preset hot data table in the user configuration information and the hot data table in the hit ratio information;
    determining the total number of the to-be-loaded hot data blocks from the union set according to the storage proportions, the capacity of the shared buffer, a capacity of the flash memory device, a size of the hot data block, and the deviation value;
    determining, according to the storage proportions, the to-be-loaded hot data block to be stored into the shared buffer and the flash memory device; and
    storing, separately, the to-be-loaded hot data block into the shared buffer and the flash memory device.

2. The method for data preheating according to claim 1, wherein determining the total number of the to-be-loaded hot data blocks from the union set according to the storage proportions, the capacity of the shared buffer, the capacity of the flash memory device, the size of the hot data block, and the deviation value comprises:
    calculating a threshold of the total number of the to-be-loaded hot data blocks according to the storage proportions, the capacity of the shared buffer, the capacity of the flash memory device, and the size of the hot data block;
    calculating the number of candidate hot data tables TCT according to the threshold of the total number of the to-be-loaded hot data blocks, the total number of hot data tables in the union set, and the total number of hot data blocks in the union set, wherein the candidate hot data table is first TCT hot data table whose hit count is the highest in the union set;
    calculating the number of candidate hot data blocks in each candidate hot data table according to the threshold of the total number of the to-be-loaded hot data blocks, the total number of hot data blocks in the candidate hot data table, and the total number of hot data blocks in the union set; and
    sifting out the to-be-loaded hot data block from the candidate hot data block in the candidate hot data table, and obtaining the total number of the to-be-loaded hot data blocks.

3. The method for data preheating according to claim 2, wherein calculating the threshold of the total number of the to-be-loaded hot data blocks according to the storage proportions, the capacity of the shared buffer, the capacity of the flash memory device, and the size of the hot data block comprises:
    calculating the threshold of the total number of the to-be-loaded hot data blocks according to $$TDB = \frac{(a_1 \times BufCapacity + a_2 \times Capacity)}{BlockSize},$$

wherein TDB is the threshold of the total number of the to-be-loaded hot data blocks, $a_1$ is the storage proportion of the to-be-loaded hot data block stored into the shared buffer, $a_2$ is the storage proportion of the to-be-loaded hot data block stored into the flash memory device, $0 \leq a_1 \leq 1$, $0 \leq a_2 \leq 1$, BufCapacity is the capacity of the shared buffer, Capacity is the capacity of the flash memory device, and BlockSize is the size of the hot data block.

4. The method for data preheating according to claim 2, wherein calculating the number of candidate hot data tables TCT according to the threshold of the total number of the to-be-loaded hot data blocks, the total number of hot data tables in the union set, and the total number of hot data blocks in the union set comprises:
    calculating the number of candidate hot data tables TCT according to $$TCT = \left\lceil TT \times \left(\frac{TDB}{TB} \times 100\%\right) \right\rceil,$$

wherein TCT is the number of candidate hot data tables, TT is the total number of hot data tables in the union set, TDB is the threshold of the total number of the to-be-loaded hot data blocks, and TB is the total number of hot data blocks in the union set.

5. The method for data preheating according to claim 2, wherein calculating the number of candidate hot data blocks in each candidate hot data table according to the threshold of the total number of the to-be-loaded hot data blocks, the total number of hot data blocks in the candidate hot data table, and the total number of hot data blocks in the union set comprises:

calculating the number of candidate hot data blocks in each candidate hot data table according to $$BN = \left\lceil TBN \times \left(\frac{TDB}{TB} \times 100\%\right) \right\rceil,$$

wherein BN is the number of candidate hot data blocks in each candidate hot data table, TBN is the total number of hot data blocks in each candidate hot data table, TDB is the threshold of the total number of the to-be-loaded hot data blocks, and TB is the total number of hot data blocks in the union set.

6. The method for data preheating according to claim 2, wherein sifting out the to-be-loaded hot data block from the candidate hot data block in the candidate hot data table, and obtaining the total number of the to-be-loaded hot data blocks comprises:

calculating a sifting base value of each candidate hot data table according to $FB = THN_{TCT/2} \times BR_{BN}$, wherein FB is the sifting base value of each candidate hot data table, $THN_{TCT/2}$ is a hit count of a $\lceil TCT/2 \rceil^{th}$ candidate hot data table, and $BR_{BN}$ is a hit ratio of a $BN^{th}$ hot data block of hot data blocks whose hit ratios are the highest in each candidate hot data table;

calculating the hit count of the candidate hot data block in each candidate hot data table according to $PB = PT \times QB$, wherein PB is the hit count of the candidate hot data block in each candidate hot data table, PT is the hit count of each candidate hot data table, and QB is the hit ratio of the candidate hot data block in each candidate hot data table;

adding together all first candidate hot data blocks in the candidate hot data table whose hit counts are greater than or equal to the sifting base value of the candidate hot data table, and obtaining the total number of first sifting hot data blocks; and determining that the first candidate hot data blocks are the to-be-loaded hot data blocks and obtaining the total number of the to-be-loaded hot data blocks when the total number of the first sifting hot data blocks is within a range of the threshold of the total number of the to-be-loaded hot data blocks plus or minus the deviation value.

7. The method for data preheating according to claim 6, further comprising:

multiplying the sifting base value by a preset multiple, and obtaining a new sifting base value when the total number of the first sifting hot data blocks is not within the range of the threshold of the total number of the to-be-loaded hot data blocks plus or minus the deviation value;

adding together all second candidate hot data blocks in the candidate data table whose hit counts are greater than or equal to the new sifting base value, and obtaining the total number of second sifting hot data blocks; and determining that the second candidate hot data blocks are the to-be-loaded hot data blocks, and obtaining the total number of the to-be-loaded hot data blocks when the total number of the second sifting hot data blocks is within the range of the threshold of the total number of the to-be-loaded hot data blocks plus or minus the deviation value.

8. The method for data preheating according to claim 1, wherein the method further comprises:

collecting statistics on the hit ratio information of hot data in real time and updating the hit ratio information stored into the flash memory device when the database runs; and backing up data in the flash memory device to a hard disk, wherein the backup data comprises the updated hit ratio information.

9. An apparatus for data preheating, the apparatus comprising:

a processing device comprising at least one processor, the processing device configured to:

read, separately, hit ratio information and user configuration information when a database is started, wherein the hit ratio information comprises a hot data table, and the user configuration information comprises a preset hot data table, storage proportions of a to-be-loaded hot data block stored into a shared buffer and a flash memory device, a capacity of the shared buffer, a storage capability of the flash memory device, and a deviation value of the total number of the to-be-loaded hot data blocks;

obtain a union set of the preset hot data table in the user configuration information and the hot data table in the hit ratio information;

determine the total number of the to-be-loaded hot data blocks from the union set according to the storage proportions, the capacity of the shared buffer, a capacity of the flash memory device, a size of the hot data block, and the deviation value;

determine the to-be-loaded hot data block to be stored into the shared buffer and the flash memory device according to the storage proportions; and store, separately, the to-be-loaded hot data block into the shared buffer and the flash memory device.

10. The apparatus for data preheating according to claim 9, wherein the processing device is further configured to:

calculate a threshold of the total number of the to-be-loaded hot data blocks according to the storage proportions, the capacity of the shared buffer, the capacity of the flash memory device, and the size of the hot data block;

calculate the number of candidate hot data tables TCT according to the threshold of the total number of the to-be-loaded hot data blocks, the total number of hot data tables in the union set, and the total number of hot data blocks in the union set, wherein the candidate hot data table is first TCT hot data table whose hit count is the highest in the union set;

calculate the number of candidate hot data blocks in each candidate hot data table according to the threshold of the total number of the to-be-loaded hot data blocks, the total number of hot data blocks in the candidate hot data table, and the total number of hot data blocks in the union set; and sift out the to-be-loaded hot data block from the candidate hot data block in the candidate hot data table, and obtain the total number of the to-be-loaded hot data blocks.

11. The apparatus for data preheating according to claim 9, wherein the processing device is configured to calculate a threshold of the total number of the to-be-loaded hot data blocks according to $$TDB = \frac{(a_1 \times BufCapacity + a_2 \times Capacity)}{BlockSize},$$

wherein TDB is the threshold of the total number of the to-be-loaded hot data blocks, $a_1$ is the storage proportion of the to-be-loaded hot data block stored into the shared buffer, $a_2$ is the storage proportion of the to-be-loaded hot data block stored into the flash memory device, $0 \leq a_1 \leq 1$, $0 \leq a_2 \leq 1$, BufCapacity is the capacity of the shared buffer, Capacity is the capacity of the flash memory device, and BlockSize is the size of the hot data block.

12. The apparatus for data preheating according to claim 9, wherein the processing device is configured to calculate the number of candidate hot data tables TCT according to $$TCT = \left\lceil TT \times \left(\frac{TDB}{TB} \times 100\%\right) \right\rceil,$$

wherein TCT is the number of candidate hot data tables, TT is the total number of hot data tables in the union set, TDB is the threshold of the total number of the to-be-loaded hot data blocks, and TB is the total number of hot data blocks in the union set.

13. The apparatus for data preheating according to claim 9, wherein the processing device is configured to calculate the number of candidate hot data blocks in each candidate hot data table according to $$BN = \left\lceil TBN \times \left(\frac{TDB}{TB} \times 100\%\right) \right\rceil,$$

wherein BN is the number of candidate hot data blocks in each candidate hot data table, TBN is the total number of hot data blocks in each candidate hot data table, TDB is the threshold of the total number of the to-be-loaded hot data blocks, and TB is the total number of hot data blocks in the union set.

14. The apparatus for data preheating according to claim 9, wherein the processing device is further configured to:
calculate a sifting base value of each candidate hot data table according to $FB = THN_{TCT/2} \times BR_{BN}$, wherein FB is the sifting base value of each candidate hot data table, $THN_{TCT/2}$ is the hit count of a $\lceil TCT/2 \rceil^{th}$ candidate hot data table, and $BR_{BN}$ is a hit ratio of a $BN^{th}$ hot data block of hot data blocks whose hit ratios are the highest in each candidate hot data table;
calculate the hit count of the candidate hot data block in each candidate hot data table according to $PB = PT \times QB$, wherein PB is the hit count of the candidate hot data block in each candidate hot data table, PT is the hit count of each candidate hot data table, and QB is the hit ratio of the candidate hot data block in each candidate hot data table;
add together all first candidate hot data blocks in the candidate data table whose hit counts are greater than or equal to the sifting base value of the candidate hot data table, and obtain the total number of first sifting hot data blocks; and
determine that the first candidate hot data blocks are the to-be-loaded hot data blocks and obtain the total number of the to-be-loaded hot data blocks when the total number of the first sifting hot data blocks is within a range of the threshold of the total number of the to-be-loaded hot data blocks plus or minus the deviation value.

15. The apparatus for data preheating according to claim 9, wherein the processing device is further configured to:
multiply the sifting base value by a preset multiple and obtain a new sifting base value when the total number of the first sifting hot data blocks is not within the range of the threshold of the total number of the to-be-loaded hot data blocks plus or minus the deviation value;
add together all second candidate hot data blocks in the candidate data table whose hit counts are greater than or equal to the new sifting base value, and obtain the total number of second sifting hot data blocks; and
determine that the second candidate hot data blocks are the to-be-loaded hot data blocks and obtain the total number of the to-be-loaded hot data blocks when the total number of the second sifting hot data blocks is within the range of the threshold of the total number of the to-be-loaded hot data blocks plus or minus the deviation value.

16. The apparatus for data preheating according to claim 9, wherein the processing device is further configured to:
collect statistics on the hit ratio information of hot data in real time and update the hit ratio information stored into the flash memory device when the database runs; and
back up data in the flash memory device to a hard disk, wherein the backup data comprises the updated hit ratio information.

* * * * *